(12) United States Patent
Lu et al.

(10) Patent No.: US 8,586,643 B2
(45) Date of Patent: Nov. 19, 2013

(54) COMPOSITION CONTAINING POLYHYDROXYALKANOATE COPOLYMER AND POLYLACTIC ACID USED FOR PREPARING FOAMING MATERIAL

(76) Inventors: Weichuan Lu, Tianjin (CN); Mei Li, Tianjin (CN)

( * ) Notice: Subject to any disclaimer, the term of this patent is extended or adjusted under 35 U.S.C. 154(b) by 626 days.

(21) Appl. No.: 12/439,506

(22) PCT Filed: Oct. 16, 2006

(86) PCT No.: PCT/CN2006/002706
§ 371 (c)(1),
(2), (4) Date: Feb. 27, 2009

(87) PCT Pub. No.: WO2008/028344
PCT Pub. Date: Mar. 13, 2008

(65) Prior Publication Data
US 2009/0239963 A1    Sep. 24, 2009

(30) Foreign Application Priority Data

Aug. 29, 2006  (CN) .......................... 2006 1 0015478

(51) Int. Cl.
*C08J 9/228* (2006.01)
*C08L 67/04* (2006.01)

(52) U.S. Cl.
USPC ........... 521/134; 521/136; 521/182; 521/189; 525/415; 525/450; 528/357; 528/361; 528/398; 528/480; 528/491

(58) Field of Classification Search
USPC .......... 521/134, 136, 182, 189; 525/415, 450; 528/357, 361, 398, 480, 491
See application file for complete search history.

(56) References Cited

U.S. PATENT DOCUMENTS

| | | | | |
|---|---|---|---|---|
| 6,117,658 A | * | 9/2000 | Dennis et al. | 435/135 |
| 6,808,795 B2 | * | 10/2004 | Noda et al. | 428/221 |
| 2003/0217648 A1 | * | 11/2003 | Noda et al. | 99/485 |

FOREIGN PATENT DOCUMENTS

| | | | | |
|---|---|---|---|---|
| JP | 2000007816 A | * | 1/2000 |
| JP | 2003327737 A | * | 11/2003 |
| JP | 2005008869 A | * | 1/2005 |

* cited by examiner

*Primary Examiner* — Irina S Zemel
(74) *Attorney, Agent, or Firm* — Global IP Services; Tianhua Gu

(57) ABSTRACT

A composition used for preparing foaming material comprising a polyhydroxyalkanoate, a polylactic acid and a foaming agent, which posses certain tensile strength, elongation in break and expansion ratio as well as full bio-degradability, thus can be used in packaging industry.

8 Claims, No Drawings

COMPOSITION CONTAINING POLYHYDROXYALKANOATE COPOLYMER AND POLYLACTIC ACID USED FOR PREPARING FOAMING MATERIAL

TECHNICAL FIELD

The present invention relates to the field of technology on polymer, in particular, this invention discloses a composition which comprises biodegradable high molecular polymer and can be used for preparing foam material, it can be broadly applied to packaging industry.

BACKGROUND ART

Plastic industry has brought convenience to human life, while it has also caused severe environmental problems. Currently, the total annual plastic production is about 140 million tons, with 50% to 60% of which is abandoned. The most severe environmental pollution in China is concentrated on the usage of disposable products, such as tableware, plastic packaging boxes, bags, films and medical plastic products.

Nowadays disposable products sold in market are mainly made of foaming materials such as polyethylene-starch blend and polyphenylene, polypropylene-starch blend and polyphenylene, polypropylene/starch blend and polyphenylene, none of these foam disposable products however will completely degrade into $CO_2$ and $H_2O$ in biodegradation processes. For example, in polyethylene-starch foam, since starch is physically mixed in polyethylene rather than attached to the large molecular chain of polyethylene, degradation of the starch will not cause the polyethylene to degrade, therefore, though from appearance the foam product is mashed after degradation processes, the large molecular polyethylene is still there and only in smaller geometry size, which would in fact accelerate its influence on soil and cause environmental pollution.

Polyhydroxyalkanoates, for example poly(3-hydroxylbutyrate-co-4-hydroxylbutyrate) P(3HB-co-4HB), poly(3-hydroxylbutyrate-co-3-hydroxyvalerate) P (3HB-co-3HV), poly(3-hydroxybutyrate-co-3-hydroxyhexanoate) P(3HB-co-3HHx) and poly(3-hydroxybutyrate-co-3-hydroxydecanoate) P(3HB-co-3HD) are all possess good flexibility and will completely degrade into $CO_2$ and water after 3~6 months under nature environments such as sea water, sewage or soil with high bacteria density. Additionally, these polymers are manufactured in fermentation processes which are clean and environmental friendly.

However, since the above-mentioned polyhydroxyalkanoates are normally semi-crystalline thermoplastic polyester compound which have low crystallinities and low melting points, the crystallization rate is low and adhesion may occur during cooling, which make it difficult to collect the finished article and the yield is very low. In the meantime, cost for producing these bio-polyesters is relatively high at present.

Therefore, there is a need to use the bio-degradable characteristics and overcome the defects such as low crystallinities and melting points associated with the above-mentioned polyhydroxyalkanoates to find a cost effective bio-degradable foam which is suitable for batch production by available foam plastic plants on market, and therefore can be widely used in the packaging industry.

SUMMARY OF THE INVENTION

To meet the need, inventors of this invention have done many experiments and gotten a composition by blending a biodegradable polylactic acid (PLA) with the above-mentioned polyhydroxyalkanoate, furthermore, a composition with improved processability can be acquired by adding polyactic acid, foaming agent and other aids into the above-mentioned polyhydroxyalkanoate and blending, foam articles suitable for packaging are produced according to the composition, which is advantageous in that traditional process and method can be employed, finished articles can be biodegraded.

This invention discloses a composition used for preparing foaming material comprising polyhydroxyalkanoate, polylactic acid and foaming agent, wherein the polyhydroxyalkanoate comprises two randomly repeating monomer units, with a first monomer unit of formula (I)

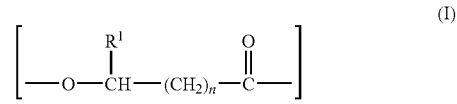

wherein $R^1$ is one of H, or $C_1$ or $C_2$ alkyl, and n is 1 or 2, and a second monomer unit of formula (II)

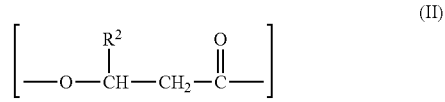

wherein $R^2$ is $C_1$-$C_{10}$ alkyl,
or with the second monomer unit of formula (III)

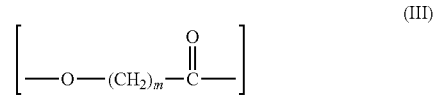

wherein m is 2-9, and
the mole ratio of the first monomer unit to the second monomer unit is 5:95-98:2.

The above-mentioned composition as disclosed in this invention, wherein $R^1$ is —$CH_3$, n is 1 for the first monomer unit of the polyhydroxyalkanoate.

The above-mentioned composition as disclosed in this invention, wherein the polyhydroxyalkanoate is one of poly (3-hydroxylbutyrate-co-4-hydroxylbutyrate) P(3HB-co-4HB), poly(3-hydroxylbutyrate-co-3-hydroxyvalerate) P (3HB-co-3HV), poly(3-hydroxybutyrate-co-3-hydroxyhexanoate) P(3HB-co-3HHx) and poly(3-hydroxybutyrate-co-3-hydroxydecanoate) P(3HB-co-3HD).

The above-mentioned composition as disclosed in this invention, wherein the polyhydroxyalkanoate is poly(3-hydroxylbutyrate-co-4-hydroxylbutyrate) P(3HB-co-4HB).

The above-mentioned composition as disclosed in this invention, wherein the foaming agent is one of azodicarbonamide, butane, $CO_2$, $H_2O$ and nitrogen, preferably, it is azodicarbonamide or butane.

The above-mentioned composition as disclosed in this invention, wherein the parts by weight (pbw) ratio of polyhydroxyalkanoate:polylactic acid foaming agent is 100:100~700:0.2~1.5.

The above-mentioned composition as disclosed in this invention which further comprises a organic additive and/or a inorganic additive in nano to macro scale, wherein the organic additive is organic solid which may be starch or degradable fatty acid such as glyceride or protein, the inorganic additive may be one of talcum powder, calcium carbonate, silicon oxide and titanium oxide.

The above-mentioned composition as disclosed in this invention wherein the pbw ratio of polyhydroxyalkanoate:polylactic acid:foaming agent:organic and/or inorganic additive is 100:100~700:0.2~1.5:0~60.

The composition as disclosed in this invention which further comprises an aid, wherein the aid is stearic acid or calcium stearate.

The composition as disclosed in this invention, wherein the pbw ratio of the polyhydroxyalkanoate:the polylactic acid:the foaming agent:the organic and/or the inorganic additive:the aid is 100:100~700:0.2~1.5:0~60:0~5.

Main components of the co-mixture disclosed in this invention are biodegradable polyhydroxyalkanoate and biodegradable polylactic acid (PLA). The polyhydroxyalkanoate disclosed in this invention is polyhydroxyalkanoate having two randomly repeating monomer units comprising a first monomer unit of formula (I)

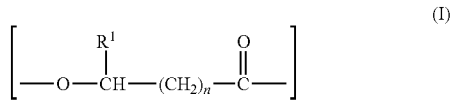

wherein $R^1$ is H, or $C_1$ or $C_2$ alkyl, and n is 1 or 2, and a second monomer unit of formula (II)

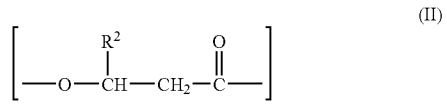

wherein $R^2$ is $C_1$-$C_{10}$ alkyl,
or with the second monomer of formula (III)

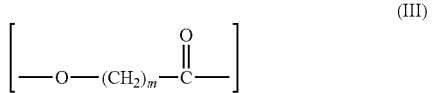

wherein m is 2-9,
the mole ratio of the first monomer unit to the second monomer unit is 5:95-98:2.

The biodegradable polylactic acid (PLA) in this invention has general formula:

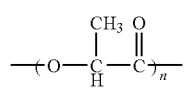

The foaming agent is azodicarbonamide, butane, $CO_2$, $H_2O$ or nitrogen, wherein azodicarbonamide (AC) is used as chemical foaming agent, and butane, $CO_2$, $H_2O$ or nitrogen is used as physical foaming agent.

In this invention, more preferably, an organic and/or an inorganic additive is added into the composition, the organic and/or the inorganic additive is/are used to improve lubrication and reduce cost, preferably the size of it is nano to macro scale, the organic additive is starch, protein or degradable fatty acid such as glyceride. The inorganic additive is talcum powder, silicon oxide, titanium oxide or calcium carbonate.

In this invention, more preferably, an aid can be added into the composition, wherein said aid can be stearic acid or calcium steriate.

Based on experiments carried out by the inventors of this invention, it is found that a foaming material suitable for different needs in packaging industry can be acquired when the pbw ratio of the polyhydroxyalkanoate, the polylactic acid, the foaming agent, the organic and/or the inorganic additive, and the aid, is 100:100~700:0.2~1.5:0~60:0~5.

A method for preparing foaming material from the composition in this invention, which can be carried out by traditional extruders is also disclosed. Firstly, a composition is prepared according to the pbw ratio of the components, then the composition is dry-mixed and extruded into pellets, the pellets are then melt in an extruder at a predetermined temperature and extruded to an auxiliary device where a variety of articles are molded. Foaming sheet can be obtained through plate flow-casting or T-shape extruder head, foam can be obtained through tubular head, cooled by water or through polishing metallic roller, finished articles are then collected.

Finished articles are then tested by different experiments on impact strength, elongation at break, foam ratio, different foams with different endurances to the impact strength, elongation at break, foam ratio can be gotten by different formulations, those foams have properties as flexibility, strength, adibaticty, resistance to normal solvents, impervious to water, nontoxic etc, and these properties can meet the requirements on packages for hot snack foods and frozen foods. The molding process of the finished articles is simple, having continuous molding cycle, a relatively low energy consumption, a high yield, and can be operated easily and industrialized. Abandoned finished articles manufactured from such foam material are bio-degradable, i.e. can be degraded into $CO_2$ and $H_2O$ completely in environments such as sea water/waste water or soil with high bacteria density within several months, which make it secondary contamination free and environmental friendly.

PREFERRED EMBODIMENTS

It shall be understood that examples and embodiments described herein are for illustrative purpose only, they should not, however, be construed as limiting the scope of the invention.

polyhydroxyalkanoate: from Tianjin green biosciences Co. Ltd.
Other components are from market if not mentioned specifically

EXAMPLE

Preparation of the Foaming Material

All components are count in parts by weight (pbw) and the main component, i.e. polyhydroxyalkanoate, with 100 parts is used as a reference parts:

| | |
|---|---|
| polyhydroxyalkanoate | 100 parts |
| polylactic acid (PLA) | 100~700 parts |
| foaming agent | 0.2~1.5 parts |
| organic and/or inorganic additive | 0~60 parts |
| aid | 0~5 parts |

Process: all components are mixed and extruded into pellets. The pellets are then melt and extruded, at a temperature between 140° C.~180° C., with the screw rotation rate of the extruder at 20~150 rpm, and then molded into foaming sheet by water cooling. Foaming sheet are then transferred in to a plastic absorbing machine to be plastic absorb molded to finished articles.

Example 1

100 parts of P(3HB-co-5 mol % 4HB), 700 parts of PLA, 1.5 parts of AC, with all components are counted in part by weight. All components are mixed and extruded into pellets, the pellets are then melt and extruded into foaming sheet, the foaming sheet is then absorb molded into finished articles.

Example 2

100 parts of P(3HB-co-95 mol % 4HB), 400 parts of PLA, 1.0 part of AC, 0.2 parts of calcium stearate, with all components counted in parts by weights. All components are mixed and extruded into pellets, the pellets are then melt and extruded into foaming sheet, the foaming sheet is then absorb molded into finished articles.

Example 3

100 parts of P(3HB-co-10 mol % 4HB), 700 parts PLA, 1.0 part of AC, 50 parts of maize starch, 3.0 parts of talcum powder, and 4.0 parts of stearic acid, with all components counted in parts by weight. All components are mixed and extruded into pellets, the pellets are then melt and extruded into foaming sheet, the foaming sheet is then absorb molded into finished articles.

Example 4

100 parts of P(3HB-co-10 mol % 4HB), 500 parts of PLA, 0.6 parts of AC, 2.5 parts of talcum powder, and 0.2 parts of stearic acid, with all components counted in parts by weight. All components are mixed and extruded into pellets, the pellets are then melt and extruded into foaming sheet, the foaming sheet is then plastics absorb molded into finished articles.

Example 5

100 parts of P(3HB-co-40 mol % 4HB), 500 parts of PLA, 1.0 part of AC, 20 parts of maize starch, 1.0 part of talcum powder, and 0.2 parts of stearic acid, with all components counted in parts by weight. All components are mixed and extruded into pellets, the pellets are then melt and extruded into foaming sheet, the foaming sheet is then plastics absorb molded into finished articles.

Example 6

100 parts of P(3HB-co-40 mol % 4HB), 200 parts of PLA, 1.0 part of AC, 0.5 parts of talcum powder, and 0.2 parts of stearic acid, with all components counted in parts by weight. All components are mixed and extruded into pellets, the pellets are then melt and extruded into foaming sheet, the foaming sheet is then plastics absorb molded into finished articles.

Example 7

100 parts of P(3HB-co-10 mol % 4HB), 700 parts of PLA, 3.0 parts of talcum powder, 30 parts of maize starch, and 0.2 parts of stearic acid, with all components counted in parts by weight. All components are mixed and extruded into pellets, the pellets are then melt and extruded and added into 0.5 parts of butane and 10 parts of monoglyceride, foaming sheet is then molded which is then plastic absorb molded into finished articles.

Example 8

100 parts of P(3HB-co-40 mol % 4HB), 600 parts of PLA, 30 parts of starch, 2.5 parts of talcum powder, and 0.2 parts of stearic acid, with all components counted in parts by weight. All components are mixed and extruded into pellets, the pellets are then melt and extruded and added into 1.0 part of butane and 9 parts of monoglyceride, foaming sheet is then molded which is then plastic absorb molded into finished articles.

Example 9

100 parts of P(3HB-co-40 mol % 4HB), 300 parts of PLA, 10 parts of starch, 1.0 part of talcum powder, and 0.2 parts of stearic acid, with all components counted in parts by weight. All components are mixed and extruded into pellets, the pellets are then melt and extruded and added into 1.5 parts of nitrogen and 8 parts of monoglyceride, foaming sheet is then molded which is then plastic absorb molded into finished articles.

Example 10

100 parts of P(3HB-co-40 mol % 4HB), 200 parts of PLA, 0.5 parts of talcum powder, and 0.2 parts of stearic acid, with all components counted in parts by weight. All components are mixed and extruded into pellets, the pellets are then melt and extruded and added into 0.2 parts of butane and 1 part of monoglyceride, foaming sheet is then molded which is then plastic absorb molded into finished articles.

Example 11

100 parts of p(3HB-co-3HV), 200 parts of PLA, 1.0 part of talcum powder, and 0.2 parts of stearic acid, with all components counted in parts by weight. All components are mixed and extruded into pellets, the pellets are then melt and extruded and added into 0.8 parts of butane and 1 part of monoglyceride, foaming sheet is then molded which is then plastic absorb molded into finished articles.

Example 12

100 parts of P(3HB-co-3HHx), 200 parts of PLA, 0.5 parts of talcum powder, and 0.2 parts of stearic acid, with all components counted in parts by weight. All components are mixed and extruded into pellets, the pellets are then melt and extruded and added into 1.2 parts of butane and 1 part of monoglyceride, foaming sheet is then molded which is then plastic absorb molded into finished articles.

Example 13

100 parts of P(3HB-co-3HD), 200 parts of PLA, 1.5 parts of talcum powder, and 0.2 parts of stearic acid, with all components counted in parts by weight. All components are mixed and extruded into pellets, the pellets are then melt and extruded and added into 1.0 part of butane and 1 part of monoglyceride, foaming sheet is then molded which is then plastic absorb molded into finished articles.

Experiment:

The finished articles obtained from example 1 to 13 are tested by tensile strength, elongation in break and degradation, wherein tensile strength and elongation in break are tested according to Chinese national standard GB/Ti040-92, degradation is done in natural environment (in sewage or sea water or sludge) for 3 to 6 month.

Results of the experiment are show below:
Physical properties of the finished articles:
tensile strength (MPa)≥3.45
elongation in break (%)≥30
degradation: complete degradation It thus can be seen from the above-mentioned results that foaming materials disclosed in this invention, which are prepared from compositions containing polyhydroxyalkanoate and polylactic acid, have met the objects such as good tensile strength, good elongation in break, and complete degradation in natural environment, of this invention, and therefore can be broadly used in packaging industry.

What is claimed is:

1. A biodegradable composition used for preparing foam material comprising:
   polyhydroxyalkanoate which consists of a poly(3-hydroxylbutyrate-co-4-hydroxylbutyrate),
   a polylactic acid, and
   a foaming agent;
   in the poly(3-hydroxylbutyrate-co-4-hydroxylbutyrate) a mole ratio of the 3-hydroxylbutyrate to 4-hydroxylbutyrate is 60:40-95:5,
   the foaming agent is one of azodicarbonamide, butane, $CO_2$, $H_2O$ and nitrogen.

2. The biodegradable composition used for preparing foam material according to claim 1, wherein the foaming agent is azodicarbonamide.

3. The biodegradable composition used for preparing foam material according to claim 1, wherein the foaming agent is butane.

4. The biodegradable composition used for preparing foam material according to claim 1, wherein the part by weight ratio of polyhydroxyalkanoate:polylactic acid:foaming agent is 100:100~700:0.2~1.5.

5. The biodegradable composition used for preparing foam material according to claim 1 which further comprises an organic and/or an inorganic additive, wherein the organic additive is starch or degradable fatty acid, the inorganic additive is one of talcum powder, silicon oxide, titanium oxide, and calcium carbonate.

6. The biodegradable composition used for preparing foam material according to claim 5, wherein the part by weight ratio of the poly(3-hydroxylbutyrate-co-4-hydroxylbutyrate):the polylactic acid:the foaming agent:the organic and/or the inorganic additive is 100:100~700:0.2~1.5:0~60.

7. The biodegradable composition used for preparing foam material according to claim 5, wherein further comprises an aid, wherein the aid is stearic acid or calcium stearate.

8. The biodegradable composition used for preparing foam material according to claim 7, wherein the part by weight ratio of the poly(3-hydroxylbutyrate-co-4-hydroxylbutyrate):the polylactic acid: the foaming agent:the organic and/or the inorganic additive:aid is 100:100~700:0.2~1.5:0~60:0~5.

* * * * *